(12) United States Patent
Muratov et al.

(10) Patent No.: US 11,175,161 B2
(45) Date of Patent: Nov. 16, 2021

(54) INDUCTIVE SENSOR FOR POSITION/ORIENTATION SENSING

(71) Applicant: MediaTek Inc., Hsin-Chu (TW)

(72) Inventors: Vladimir A. Muratov, Manchester, NH (US); Da-Shan Shiu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 637 days.

(21) Appl. No.: 15/434,315

(22) Filed: Feb. 16, 2017

(65) Prior Publication Data

US 2017/0241808 A1    Aug. 24, 2017

Related U.S. Application Data

(60) Provisional application No. 62/298,512, filed on Feb. 23, 2016.

(51) Int. Cl.
*G01D 5/20* (2006.01)
*G01B 7/00* (2006.01)

(52) U.S. Cl.
CPC ............ *G01D 5/2013* (2013.01); *G01B 7/003* (2013.01); *G01D 5/2086* (2013.01)

(58) Field of Classification Search
CPC .... G01D 5/2013; G01D 5/2086; G01D 5/204; G01D 5/2033; G01D 5/2066; G01D 5/2073; A61B 5/06; A61B 5/062; A61B 2034/2051; A61B 35/20; A61B 1/00016; A61B 1/041; A61B 1/00029; A61B 1/00158; A61B 2090/3954; A61B 2560/0219; A61B 2034/2072; A61B 2090/502; A61B 34/20; A61B 90/37; G01B 7/003; G01B 7/02; G01B 7/004; G01B 7/14; G01B 7/30; H02J 50/10; H02J 7/025; G06F 3/03545; G06F 3/038; G06F 3/0383; G06F 3/046; G06F 3/011; G06F 3/012;
(Continued)

(56) References Cited

U.S. PATENT DOCUMENTS 3,037,176 A * 5/1962 Chapman ................ H01F 27/33
336/83
3,777,255 A * 12/1973 Young .................... G01L 9/007
324/207.17
(Continued)

FOREIGN PATENT DOCUMENTS

CN      101283236 A    10/2008
EP         2948779       12/2015
(Continued)

OTHER PUBLICATIONS

Partial European Search Report for Application No. 17157496.5 dated Aug. 7, 2017.
(Continued)

*Primary Examiner* — Lee E Rodak
(74) *Attorney, Agent, or Firm* — Wolf, Greenfield & Sacks, P.C.

(57) ABSTRACT

A sensor includes a ferromagnetic shield, at least one sensor coil disposed around an exterior of the ferromagnetic shield, and an electronics module within the ferromagnetic shield. The electronics module is configured to determine the position and/or orientation of the sensor based at least in part on a measurement of a signal induced in the at least one sensor coil.

11 Claims, 10 Drawing Sheets

(58) Field of Classification Search
CPC ... G06F 3/0346; H01F 38/14; G01R 33/0206; G01R 35/005; G01R 1/18; G01R 33/00; G01R 33/0047; G01R 33/0076; G01R 33/022; G01R 33/025; G01R 33/028; G01R 33/04; G01R 33/4215; G01R 33/422

See application file for complete search history.

(56) References Cited

U.S. PATENT DOCUMENTS

| | | | | |
|---|---|---|---|---|
| 5,047,715 | A * | 9/1991 | Morgenstern | G01D 5/2013 324/207.17 |
| 5,453,686 | A * | 9/1995 | Anderson | G01S 5/0247 324/207.17 |
| 6,369,564 | B1 | 4/2002 | Khalfin et al. | |
| 2005/0027330 | A1 * | 2/2005 | Govari | A61B 5/0031 607/60 |
| 2006/0226826 | A1 | 10/2006 | Teppan | |
| 2007/0270722 | A1 * | 11/2007 | Loeb | A61B 5/06 600/595 |
| 2008/0306380 | A1 | 12/2008 | Parchak et al. | |
| 2009/0217711 | A1 * | 9/2009 | May | G01D 5/145 68/12.04 |
| 2010/0009752 | A1 * | 1/2010 | Rubin | A63F 13/06 463/36 |
| 2010/0271012 | A1 * | 10/2010 | Patterson | G01B 7/004 324/207.15 |
| 2010/0321015 | A1 * | 12/2010 | Susel | H01F 41/076 324/258 |
| 2011/0234155 | A1 | 9/2011 | Chen et al. | |
| 2013/0238270 | A1 | 9/2013 | Khalfin et al. | |
| 2016/0139213 | A1 * | 5/2016 | Shams | G01R 33/028 324/258 |
| 2016/0379743 | A1 * | 12/2016 | Sirimamilla | H01F 7/20 361/679.01 |

FOREIGN PATENT DOCUMENTS

| | | |
|---|---|---|
| JP | 2013053957 A | 3/2013 |
| TW | 201324370 A | 6/2013 |
| WO | WO 2014/116848 A1 | 7/2014 |

OTHER PUBLICATIONS

Extended European Search Report for Application No. EP 17157496.5 dated Dec. 11, 2017.
Extended European Search Report for European Application No. EP 20167042.9 dated Aug. 12, 2020.

* cited by examiner

INDUCTIVE SENSOR FOR POSITION/ORIENTATION SENSING

CROSS-REFERENCE TO RELATED APPLICATIONS

This application claims priority to U.S. provisional application Ser. No. 62/298,512, filed Feb. 23, 2016, which is hereby incorporated by reference in its entirety.

BACKGROUND

1. Technical Field

The techniques described herein relate generally to position sensors, and in particular to inductive position sensors.

2. Discussion of the Related Art

Position tracking systems are gaining increasing popularity in numerous applications such as virtual reality, wearable devices, medical devices, and Internet of Things connected devices. Current applications typically use global positioning systems (GPS) or light based sensors to determine a device's position. These applications may use the information provided by position tracking systems to move the user through an immersive virtual environment, alert a monitoring system of a patient's movement, or provide feedback on a range of motion exercise, for example.

SUMMARY

Some embodiments relate to a sensor including a ferromagnetic shield, at least one sensor coil disposed around an exterior of the ferromagnetic shield, and an electronics module within the ferrite shield configured to determine the position and/or orientation of the sensor based at least in part on a measurement of a signal induced in the at least one sensor coil.

In some embodiments, the at least one sensor coil may comprise a first and second sensor coil.

In some embodiments, the at least one sensor coil may comprise a first, second and third sensor coil.

In some embodiments, the sensor coils may be mutually orthogonal.

The ferromagnetic shield may comprise two or more sheets of ferromagnetic material.

In some embodiments, there may be an aperture in the ferromagnetic shield that allows a conductor to pass through the ferromagnetic shield to contact the electronics module.

In some embodiments, the conductor may be an antenna.

In some embodiments, the conductor allows one or more of the at least one sensor coil to electrically connect to the electronics module through the aperture.

The electronics module may include an energy storage device.

The electronics module may be configured to receive wireless power via the at least one sensor coil.

The ferromagnetic shield may comprise a container with a ferromagnetic surface.

Some embodiments relate to a method for assembling a sensor, comprising attaching at least two ferromagnetic sheets to each other, attaching at least one third ferromagnetic sheet to the attached at least two ferromagnetic sheets to form a ferromagnetic shield with an electronics module within the ferromagnetic shield and disposing at least a first coil around the ferromagnetic shield.

The method may also comprise attaching a termination of the first coil to the electronics module.

Some embodiments relate to a method for assembling a sensor, comprising inserting an electronics module into a container, depositing a ferromagnetic material on a surface of the container, and disposing at least a first coil around the container and the ferromagnetic material.

The method may also comprise attaching a termination of the first coil to the electronics module.

Some embodiments relate to a position and/or orientation sensing system comprising a base station, configured to emit a magnetic field, and a sensor comprising: a ferromagnetic shield, at least one sensor coil disposed around an exterior of the ferromagnetic shield, and an electronics module within the ferromagnetic shield configured to determine the position and/or orientation of the sensor based at least in part on a measurement of a signal induced in the at least one sensor coil by the magnetic field.

In some embodiments, the sensor may be further configured to transmit the determined position and/or orientation of the position sensor to a base station or to an external device.

In some embodiments, the sensor may be further configured to transmit the determined position and/or orientation of the position sensor to an external device.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

The inventors have recognized and appreciated that conventional position sensors may be adversely affected by their electronics and power sources. For example, the AC charging of an internal battery may induce eddy currents within the sensor coils of a position sensor, reducing the sensitivity of the sensor by increasing the noise in the sensor coils. One additional challenge with position sensors is making them suitably small for a variety of applications, such as virtual reality (VR) or medical monitoring. Magnetic induction position sensors often utilize coils that occupy a large volumetric space for increased sensitivity, along with separate, isolated electronics to process the signals in the coils. The inventors have recognized that prior solutions may be imprecise or occupy a large volume, making them impractical for many applications. Minimizing the volume occupied by the position sensor allows a position sensor to be more easily integrated into an application, or utilized by a user. For example, minimizing the volume occupied by the position sensor may be desirable in wearable applications, such as medical devices and virtual reality systems, or in Internet of Things connected applications.

One method of magnetic position sensing utilizes a base station transmitting a magnetic field. A position sensor comprises at least one coil, which may detect the field generated by the base station. The sensor may measure the strength of the signal in the at least one coil to determine its position within the field. The number of coils may determine the number of dimensions that the sensor may be able to determine its position in, and the signal strength in the coils may also be used by the sensor to determine its orientation relative to the base station. The at least one coil may be disposed around a ferromagnetic shield, so that the ferromagnetic shield may serve as a flux concentrator for the at least one coil. Additionally, the ferromagnetic shield may contain an electronics module of the position sensor. Providing a ferromagnetic shield around the electronics module may shield the at least one coil from magnetic fields produced by the electronics, which can improve sensitivity.

In some embodiments, the base station emits a magnetic field, and the position sensor detects its position in three dimensions and/or its orientation by measuring the magnetic field. The position sensor may have three sensor coils to sense components of the magnetic field in three dimensions. The position sensor may calculate its position and/or orientation based on the measured field, and communicate this information to the position sensing system or to another device, such as an attached or paired device. Prior to describing embodiments of the position sensor, an exemplary position sensing system will be described.

Figure 1:
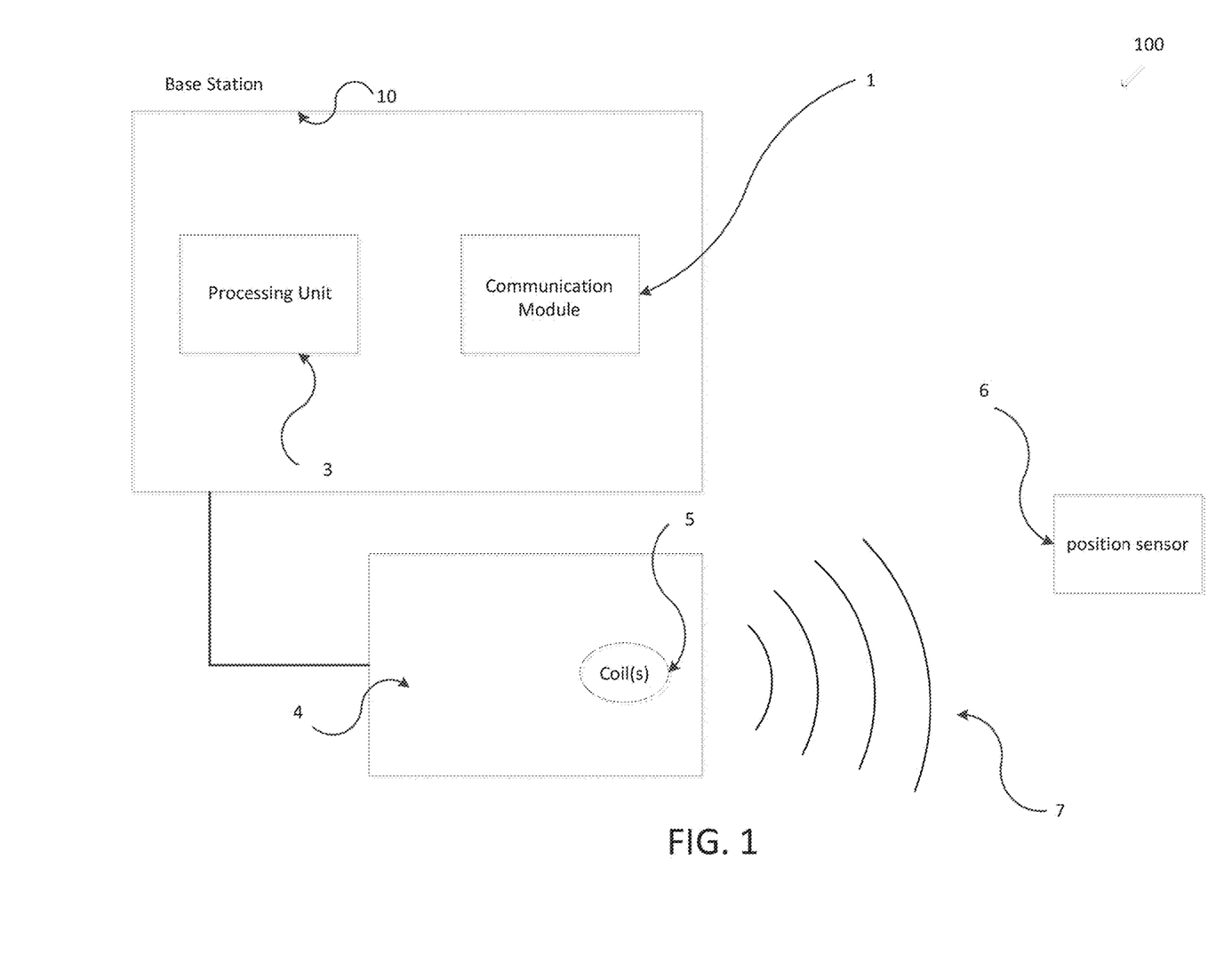
FIG. 1 shows a position sensing system with a base station and position sensor.

FIG. 1 shows an embodiment of a position sensing system 100. The position sensing system 100 may comprise a base station 10, a coil hub 4 and a position sensor 6. The base station 10 may comprise a communication module 1 to communicate with position sensor 6 using any suitable wired or wireless communication protocol. The base station 10 may include a processing unit 3 which may include one or more processors for controlling the base station 10.

The base station 10 may be in communication with at least one coil 5. The at least one coil 5 is driven with an electrical signal to generate a magnetic field 7. In some embodiments, the at least one coil 5 includes three or more coils to generate the magnetic field 7 in three dimensions. The magnetic field 7 generated by the at least one coil 5 is sensed by the position sensor 6 to detect its position and/or orientation. There are a number of ways in which the at least one coil 5 may generate a suitable magnetic field 7. As one example, three coils may be oriented to generate fields in the X direction, the Y direction, and the Z direction, respectively. The three coils may be time-multiplexed, such that only one of the three coils is energized at a time. As an example, the X coil may be energized for a period of time, then the Y coil may be energized for a period of time, then the Z coil may be energized for a period of time. The position sensor 6 may communicate with the communication module 1 to synchronize the timing of magnetic field generation and detection, so that the position sensor 6 knows which coil is energized in each time period. The position sensor 6 may include coils oriented in three different directions to detect the fields. Analyzing the strength of the field detected by each coil in each detection period allows localizing the position sensor 6 in three dimensions and/or determining its orientation. As another example, each of the three coils 5 may be energized at the same time, but at different frequencies. The position sensor 6 may analyze the strength of the signal received by the respective coils at each frequency to determine the position and/orientation of the position sensor 6.

The at least one coil 5 may be positioned within a coil hub 4 that is in communication with the base station 10. Positioning the at least one coil 5 in a separate coil hub may allow flexibility in positioning the at least one coil 5. In some embodiments, the at least one coil 5 may be positioned within the base station 10.

As mentioned above, position sensor 6 may measure the magnetic field 7 and process this information to calculate its position and/or orientation within the magnetic field 7. The sensed position and/or orientation data may then be transmitted by position sensor 6 to the communication module 1 of the base station 10 so that the position sensing system 100 may utilize the information regarding the position and/or orientation of the position sensor 6. In some embodiments, the position sensor 6 may send its sensed position and/or orientation data to another device to utilize the data for an application. For example, if the position sensor 6 is used to monitor a patient, the position sensor 6 may be embedded into a patient's or clothing, and its sensed position to a patient monitoring system. The patient monitoring system may take appropriate action based on the location of the patient, such as generating an alert to notify a nurse or medical supervisor if the patient starts moving or moves outside of an authorized area.

In some embodiments, the position sensor 6 may relay information to a mobile device. The mobile device may gather the information, send the information to a service provider over a network (e.g., the Internet), analyze the information, and/or provide information to the user, such as guidance and/or alerts. In assisted guidance applications, the position sensor 6 may be worn by a user and relay position information to a mobile device which may use the position information to give instructions to a user with a visual impairment, for example.

In such applications, optionally the base station 10 may not have a communication module 1, as the position sensor 6 may communicate with an external device or system instead.

In some embodiments, the position sensor 6 may communicate with the base station 10 and/or a mobile device to relay position information. For example, in a virtual reality system, the base station 10 may include or may be connected to a processor that provides a virtual reality environment. The position sensor 6 may be in a controller held by the user or a wearable device worn by the user, for example. The position sensor 6 may relay its position information to the base station 10 via the communication module 1. The base station 10 may use the position information to update the virtual reality environment. In some embodiments, the position information may be sent as raw data from the position sensor 6, while in other embodiments some pre-processing may be performed on the data by the position sensor 6. In some embodiments the position information may be fully processed by the position sensor 6, and only the results may be relayed to the base station 10 or to another external system.

Figure 2:
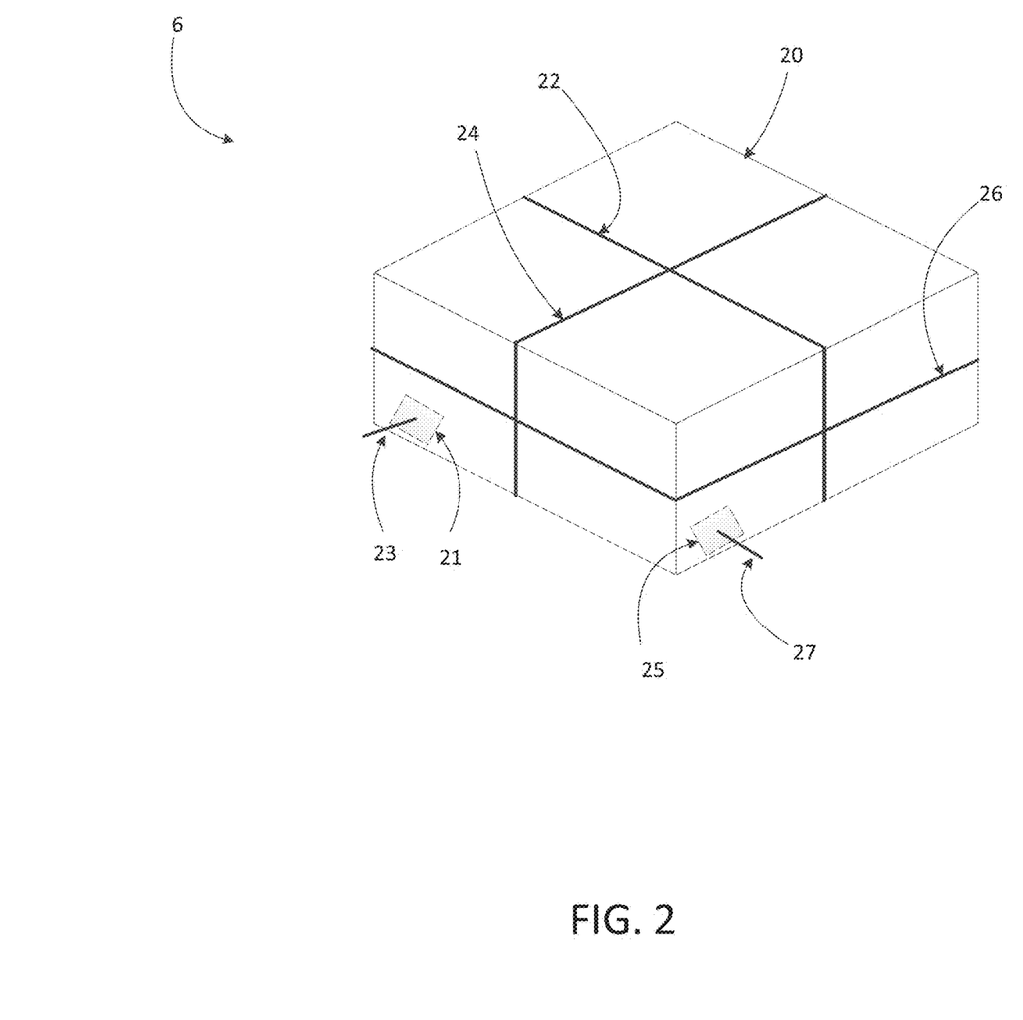
FIG. 2 shows a schematic of a 3D position sensor.

FIG. 2 shows an embodiment of a position sensor 6. The position sensor 6 may comprise a hollow ferromagnetic shield 20. The hollow ferromagnetic shield 20 may take on any shape. The hollow ferromagnetic shield 20 may have an interior cavity. The interior cavity may contain the electronics module (not shown) of the position sensor 6. The hollow ferromagnetic shield 20 may shield the rest of the position sensor 6 from detrimental effects from the electronics module. For example, the ferromagnetic shield 20 may shield the rest of the position sensor 6 from eddy currents generated by a battery within the electronics module, which may limit the flux linkage of any of the first coil 22, second coil 24, or third coil 26.

The position sensor 6 may further comprise a first coil 22, a second coil 24, and a third coil 26 disposed around the ferromagnetic shield 20. While the first coil 22, second coil 24, and third coil 26 are shown as having only a single turn each, any or all of them may have coils of any number of turns. The hollow ferromagnetic shield 20 may serve as a magnetic flux concentrator for the first coil 22, second coil 24, and third coil 26. Additionally, the hollow ferromagnetic shield 20 may serve as a shield for the first coil 22, second coil 24, and third coil 26 from potentially detrimental effects of the internal electronics (shown in FIG. 3). For example, the eddy currents generated by a battery of the internal electronics may distort the signals in unprotected coils. By placing windings of the first coil 22, second coil 24, and third coil 26 around the ferromagnetic shield 20, the magnetic field produced by eddy currents generated by the battery may be absorbed by the ferromagnetic shield 20. By wrapping the first coil 22, second coil 24, and third coil 26 around the hollow ferromagnetic shield 20 containing the internal electronics, the first coil 22, second coil 24, and third coil 26 may be approximately as large as allowed by the volume of the position sensor 6. In some embodiments, the first coil 22, second coil 24, and third coil 26 may be disposed around the ferromagnetic shield so that they are mutually orthogonal to each other.

The hollow ferromagnetic shield 20 may be comprised of any ferromagnetic material having a relative magnetic permeability greater than 5, for example. In some embodiments, the ferromagnetic material may have a relative magnetic permeability greater than 10, greater than 20, or greater than 40. The hollow ferromagnetic shield 20 may comprised of ferromagnetic sheets, such as ferrite sheets for example, attached to each other. In other embodiments, the hollow ferromagnetic shield 20 may be comprised of a mold, made of plastic or another suitable non-conductive material, with a ferromagnetic solution deposited on the interior or exterior of the mold. The mold may comprise multiple pieces to be assembled after the insertion of the electronics module, or a single piece formed around the electronics module.

The hollow ferromagnetic shield 20 may also comprises a first aperture 21 and a second aperture 25. The first aperture 21 may allow a conductor 23 to enter the hollow ferromagnetic shield 20. The conductor 23 may comprise coil terminations of any or all of the first coil 22, second coil 24, or third coil 26. The conductor 23 may also comprise a power supply connection. While the conductor 23 is shown as comprising only one conductor, it should be understood that many possible connections or conductors may be represented by conductor 23. The second aperture 25 may allow an antenna 27 to enter the hollow ferromagnetic shield 20. The antenna 27 may be any antenna suitable for Bluetooth low energy (BLE) communications, RF communications, or any other suitable communication system. In some embodiments, only one aperture may be needed, and either one or both of the conductor 23 and antenna 27 may utilize the single aperture.

Figure 3:
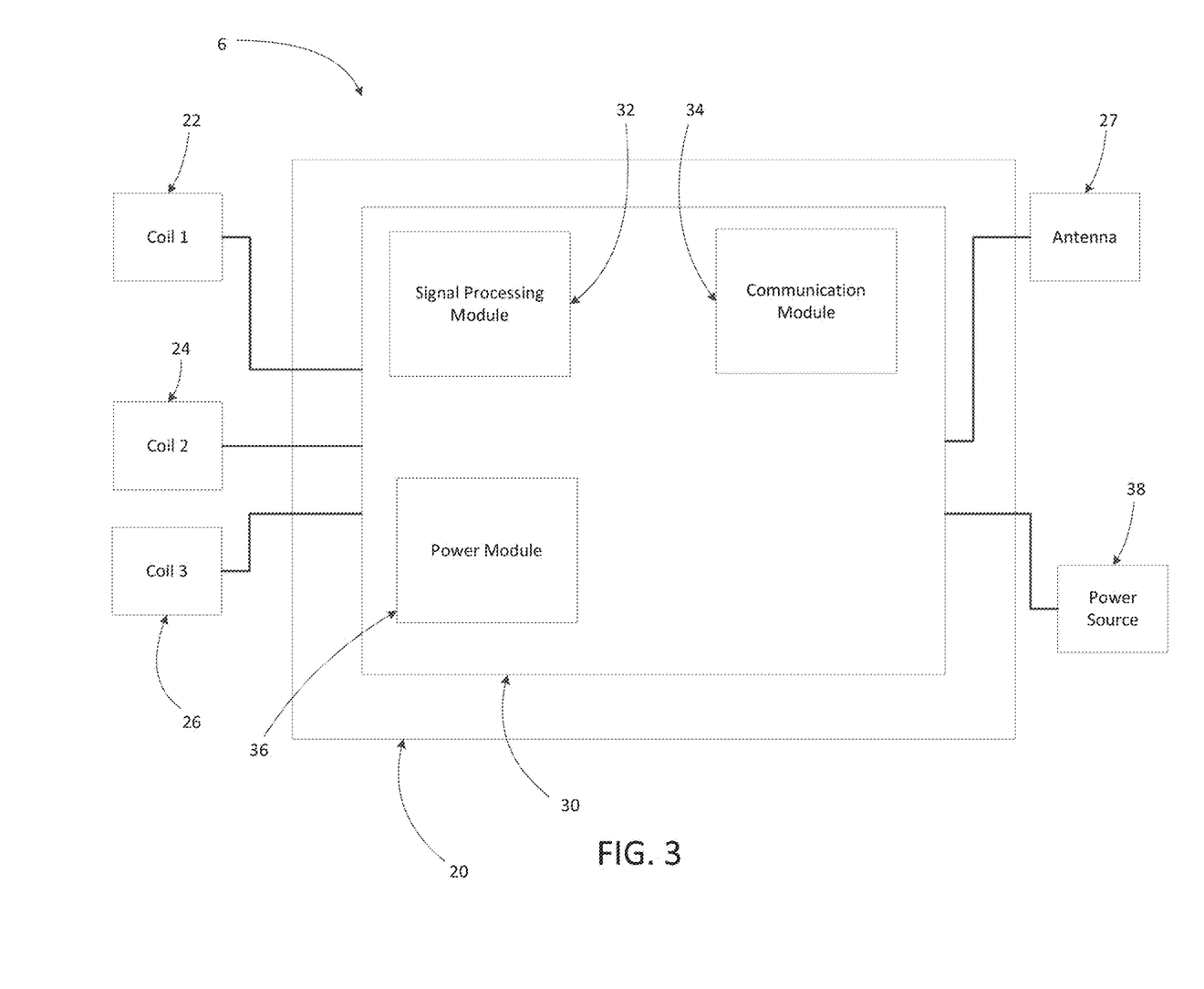
FIG. 3 shows a block diagram of a 3D position sensor.

FIG. 3 shows a block diagram of a position sensor 6. The position sensor 6 may comprise a hollow ferromagnetic shield 20, with a first coil 22, a second coil 24, a third coil 26, and an antenna 27. The position sensor 6 may additionally comprise a power source 38 and an electronics module 30. The electronics module 30 may be contained within the hollow ferromagnetic shield 20, while the power source 38 may be positioned outside of the hollow ferromagnetic shield 20. For example, the power source 38 may be a power supply or a wall outlet connected to the grid. The power source 38 may be detachable from the position sensor 6, so that the power module 36 within the position sensor 6 may be charged by the power source 38 and then detached for use, offering a wider range of mobility. In some embodiments, the power source 38 may be a wired power source or a wireless power transmitter.

The electronics module 30 may comprise a signal processing module 32, a communication module 34, and a power module 36. The signal processing module 32 may be configured to measure the signal strength in at least one of the first coil 22, the second coil 24, and the third coil 26. The signal processing module 32 may then determine the position of the position sensor 6 based on the measurement of the signal strength of the coils 22, 24, and 26. In some embodiments, the signal processing module 32 may be part of a controller which does the position determination. In some embodiments, the signal processing module 32 may be configured to communicate with a separate controller to determine the position of the position sensor 6. The communication module 34 may be configured to receive signals from the antenna 27 and/or to send signals via the antenna 27. The communication module 34 may send or receive data, status information or any other information which may depend up on the application. The power module 36 may be a battery, or any suitable energy storage device which may be charged or receive power from the power source 38.

In some embodiments, the position sensor 6 may utilize wireless charging. The wireless power may be received from the base station 10, or another wireless charging source, such as the power source 38. The wireless power may be received by any or all of the first coil 22, second coil 24, or third coil 26. In some embodiments, coils other than the first coil 22, second coil 24, and third coil 26 may be used to receive the wireless power. The signal processing module 32 may determine a level or signal strength of a signal in any of the first coil 22, second coil 24, or third coil 26. If the measured signal is above a predetermined threshold, the power module 36 may enter a wireless charging mode, and receive power from any or all of the first coil 22, second coil 24, or third coil 26.

Having described aspects of position sensor 6, examples of techniques for forming position sensor 6 will be described.

Figure 4:
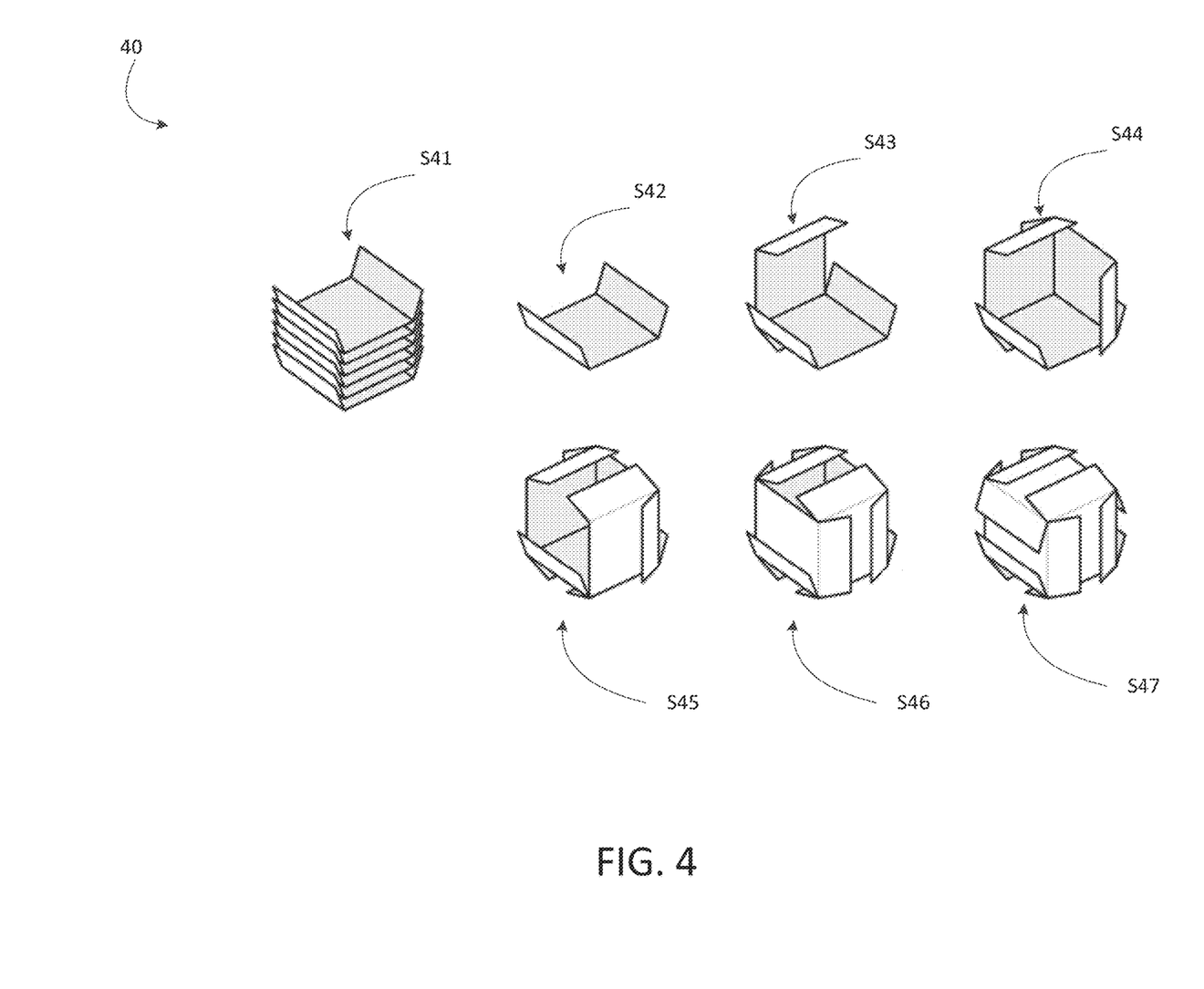
FIG. 4 shows an assembly diagram of a ferromagnetic shield.

FIG. 4 shows a method 40 of forming position sensor 6 by assembling ferromagnetic a ferromagnetic shield. In step S41, six ferromagnetic sheets are prepared. The preparation may comprise cracking the sheets along predetermined lines to allow them to be folded. In some embodiments, the sheets may be pre-cracked and the preparation may comprise aligning the tabs of the sheets. In some embodiments, the sheets may not need to be cracked. While six sheets are used in method 40, any number of sheets may be used depending on the structure and shape of the ferromagnetic shield desired. In step S42, the first ferromagnetic sheet is placed. In step S43, the second ferromagnetic sheet is positioned adjacent to the first ferromagnetic sheet, so that one of the tabs of the second ferromagnetic sheet rests below the body of the first ferromagnetic sheet. In step S44, the third ferromagnetic sheet is positioned such that one of its tabs lies outside the body of the third ferromagnetic sheet, and the body of the second ferromagnetic sheet lies perpendicular to the body of the first ferromagnetic sheet. In step S45, the fourth ferromagnetic sheet is attached to the assembly opposite the second ferromagnetic sheet. In step S46, the fifth ferromagnetic sheet is attached to the assembly opposite the third ferromagnetic sheet. In step S47, the sixth ferromagnetic sheet is attached to the assembly opposite the first ferromagnetic sheet, and the tabs of all the sheets may be attached or sealed to the bodies of the adjacent sheets.

Figure 5:
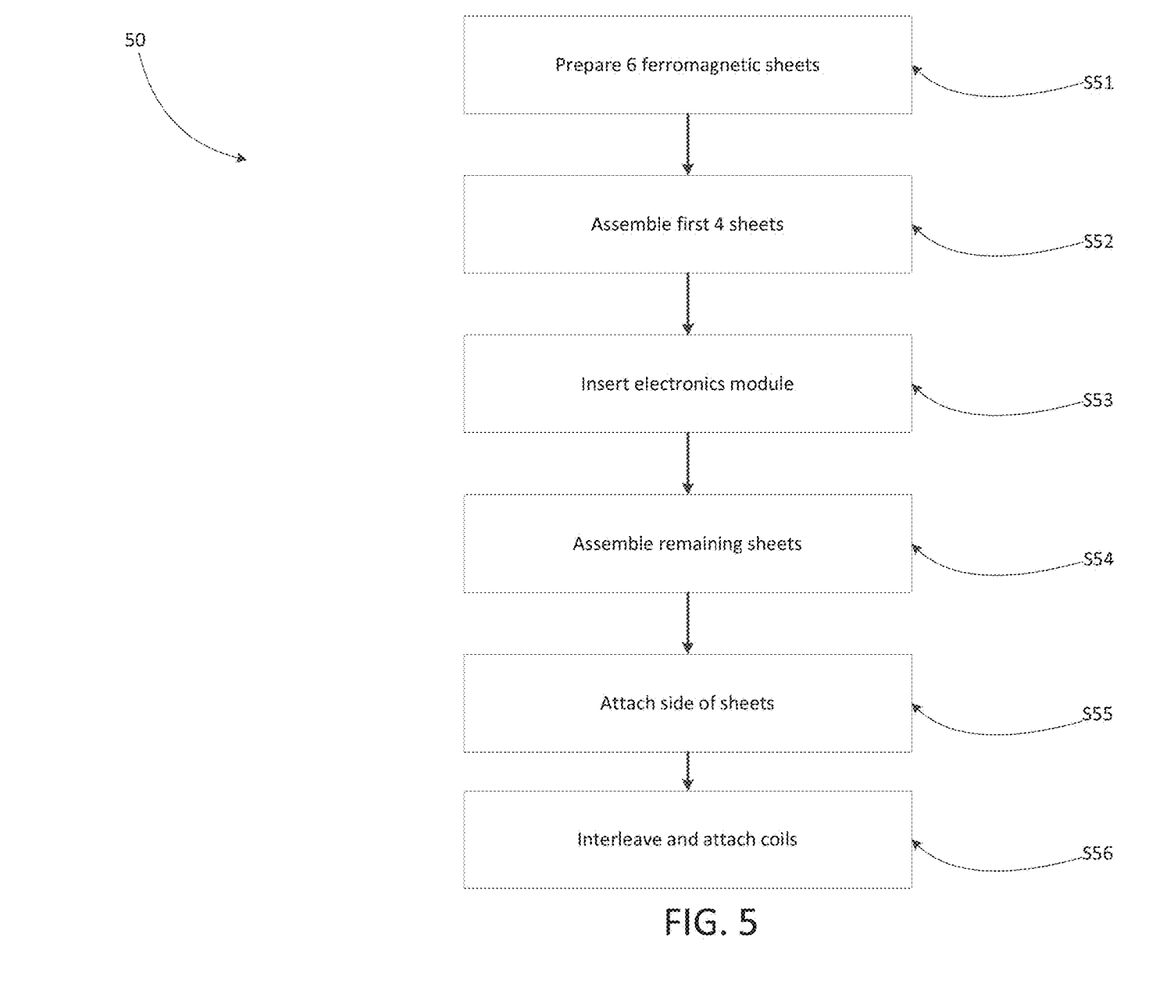
FIG. 5 shows a method for manufacturing a position sensor.

FIG. 5 shows a method 50 of assembling a position sensor 6. In step S51, 6 ferromagnetic sheets are prepared. In step S52, the first four sheets are assembled; some embodiments may use the techniques shown in FIG. 4. In step S53, the electronics module may be inserted into the cavity of the four ferromagnetic sheets from S52. In step S54, the remaining two ferromagnetic sheets may be assembled with the four sheets from S52, around the electronics module. In step 55, the sides of the sheets may be attached to each other, e.g., using a self-adhesive surface on the edges of the sheets. In step S56 the coils may be wound around the ferromagnetic sheet assembly and attached to the electronics module. In some embodiments, the number of ferromagnetic sheets may differ based on the shape of the position sensor. The number of ferromagnetic sheets assembled in step S52 is for illustrative purposes only; any number of ferromagnetic sheets may be assembled before the electronics module is inserted as long as at least one ferromagnetic sheet remains detached from the position sensor.

Figure 6:
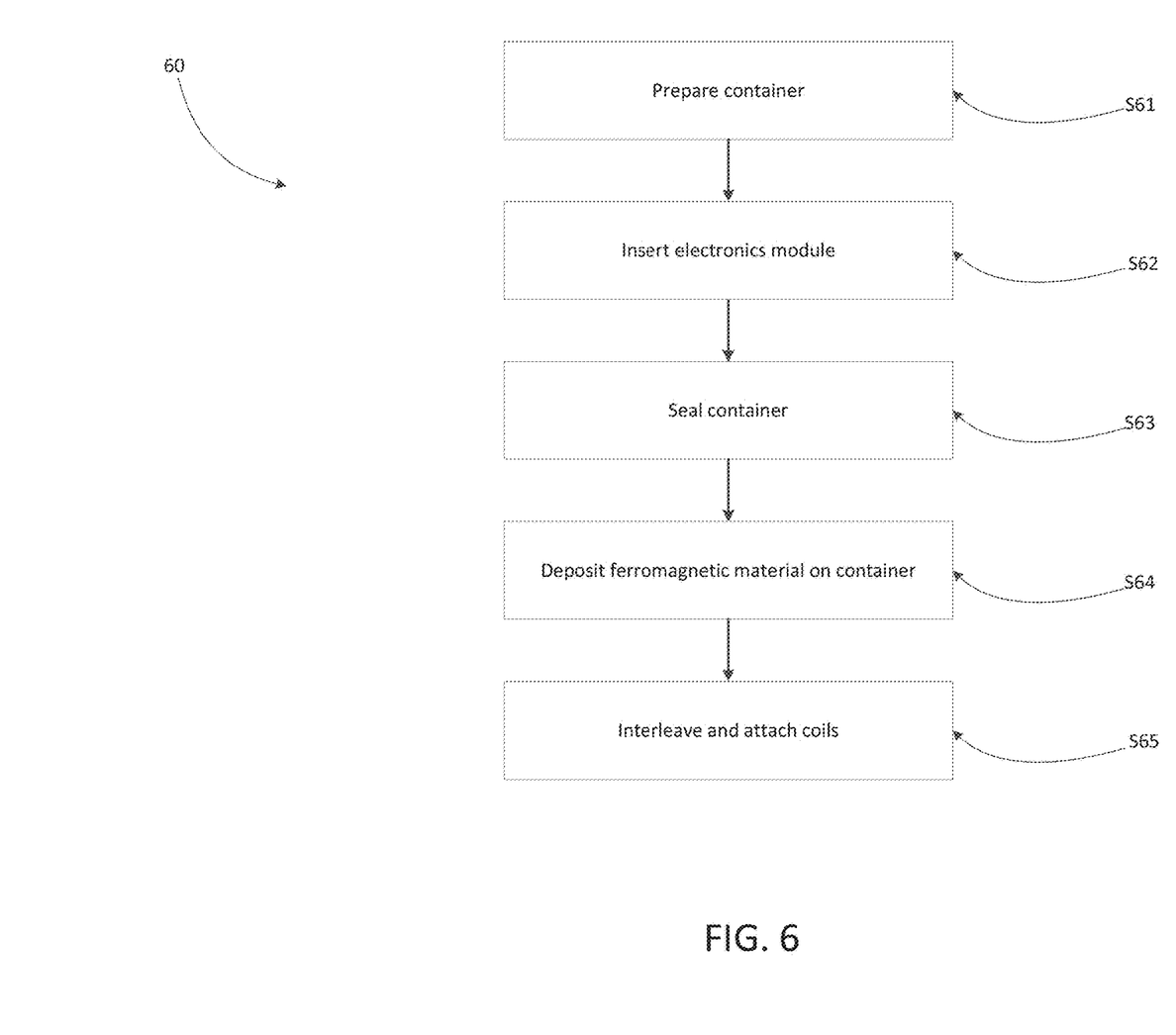
FIG. 6 shows another method for manufacturing a position sensor.

FIG. 6 shows another method 60 of assembling a position sensor 6 by adding ferrite material to the surface of a container to form the ferromagnetic shield. In step S61, a container may be prepared. The container may be made of plastic or any other material suitable for holding the electronics module. The container may be of any shape with a hollow cavity. In step S62 the electronics module may be inserted into the container. In step S63, the container may be sealed. In some embodiments, step S63 may comprise attaching two or more parts of the container. In other embodiments, step S63 may comprise closing a single container on itself. In step S64, a ferromagnetic material may be deposited on the container. The ferromagnetic material may be a ferrite infused epoxy or any other ferromagnetic solution or material which may be sprayed or deposited on the container. In step S65, the coils may be disposed around the container. In some embodiments, the coils may be further attached to the electronics module inside via adhesive, a plug, a line termination, or another suitable method.

Figure 7:
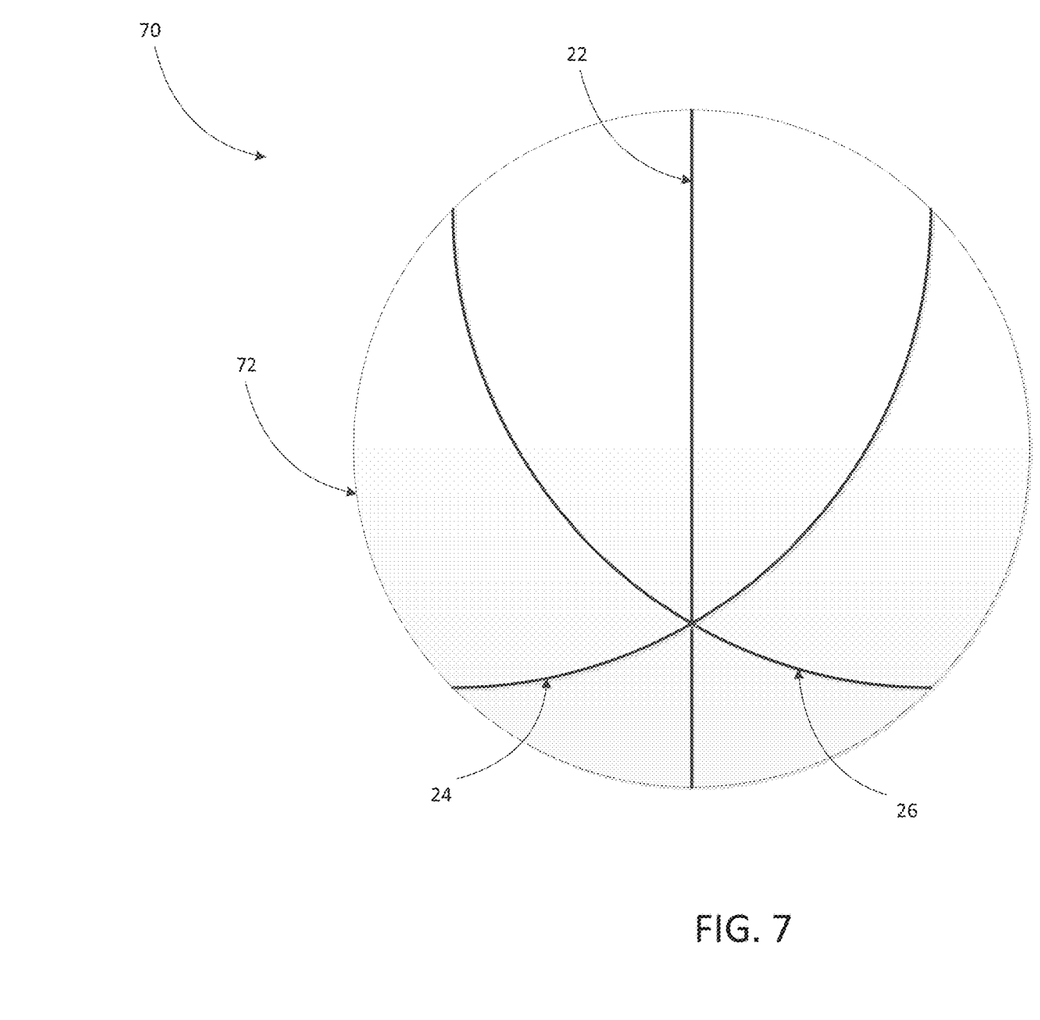
FIG. 7 shows another schematic of a 3D position sensor.

FIG. 7 shows another schematic of a 3D position sensor 70 having a spherical shape. The position sensor 70 may comprise a ferromagnetic shield 72. The first coil 22, second coil 24, and third coil 26, may be disposed around the ferromagnetic shield 72. The ferromagnetic shield 72 may also comprise apertures (not shown) for an antenna (not shown) and the terminations of the first coil 22, second coil 24, and third coil 26. The ferromagnetic shield 72 may contain an electronics module (not shown) as described above, to execute position sensing measurements and position determination calculations. The first coil 22, second coil 24, and third coil 26 may be disposed around the ferromagnetic shield 72 in any orientation so long as the planes defined by the disposed coils are not parallel to each other.

Figure 8A:
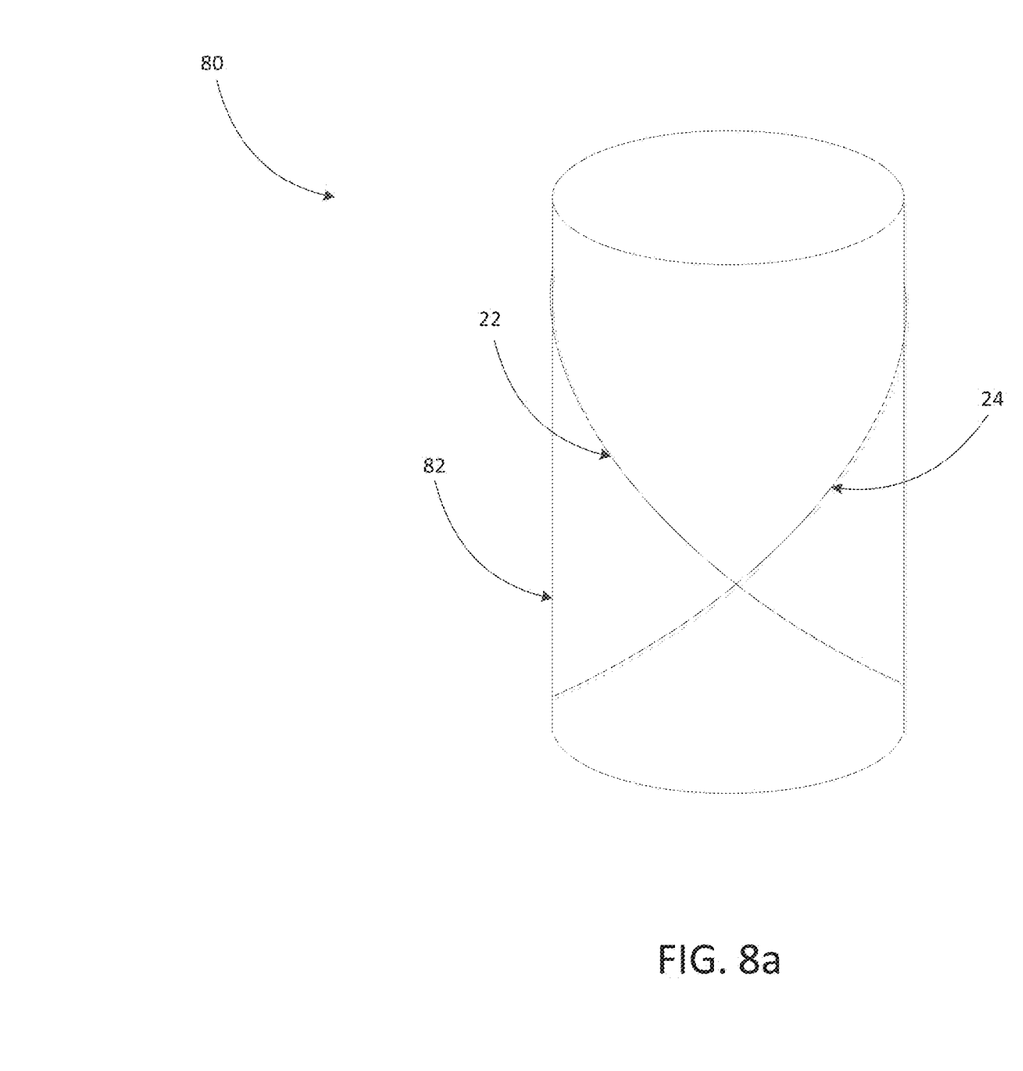
FIG. 8A shows a schematic of a 2D position sensor.

FIG. 8A shows a schematic of a 2D position sensor 80 having a cylindrical shape. The position sensor 80 may comprise a ferromagnetic shield 82, a first coil 22, and a second coil 24. The first coil 22 and second coil 24 may be disposed around the ferromagnetic shield 82 in any suitable manner so long as the planes defined by each coil are not parallel. As described above, while the first coil 22 and second coil 24 are shown as only having one winding each, they may comprise any suitable number of windings. The ferromagnetic shield 82 may contain an electronics module (not shown), attached to the terminations of the first coil 22 and the second coil 24. The electronics module may execute position sensing measurements and position determination calculations. While the ferromagnetic shield 82 is shown as a cylinder, it may take any shape suitable for containing the electronics module and having the first coil 22 and second coil 24 wound around it.

Figure 8B:
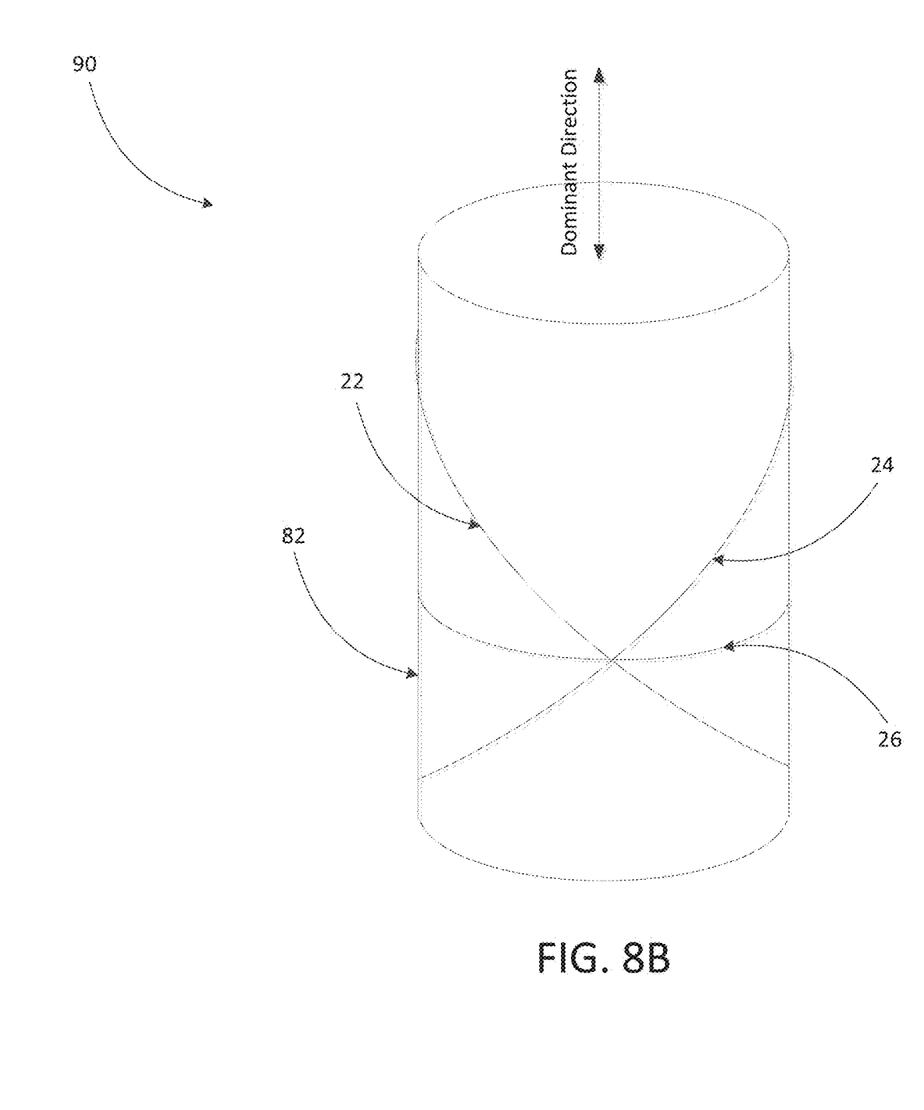
FIG. 8B shows a schematic of a 3D position sensor with a dominant direction.

FIG. 8B shows a schematic of a 3D position sensor 90 having a cylindrical shape. The position sensor 90 may comprise a ferromagnetic shield 82, a first coil 22, a second coil 24, and a third coil 26. The first coil 22, second coil 24, and third coil 26 may be disposed around the ferromagnetic shield 82 in any suitable manner so long as the planes defined by each coil are not parallel. In FIG. 8B, the third coil 26 may be substantially parallel to the top or bottom face of the ferromagnetic shield 82. As described above, while the first coil 22, second coil 24, and third coil 26 are shown as only having one winding each, they may comprise any suitable number of windings. The ferromagnetic shield 82 may contain an electronics module (not shown), attached to the terminations of the first coil 22, the second coil 24, and third coil 26. The electronics module may execute position sensing measurements and position determination calculations. While the ferromagnetic shield 82 is shown as a cylinder, it may take any shape suitable for containing the electronics module and having the first coil 22, second coil 24, and third coil 26 wound around it.

Figure 8C:
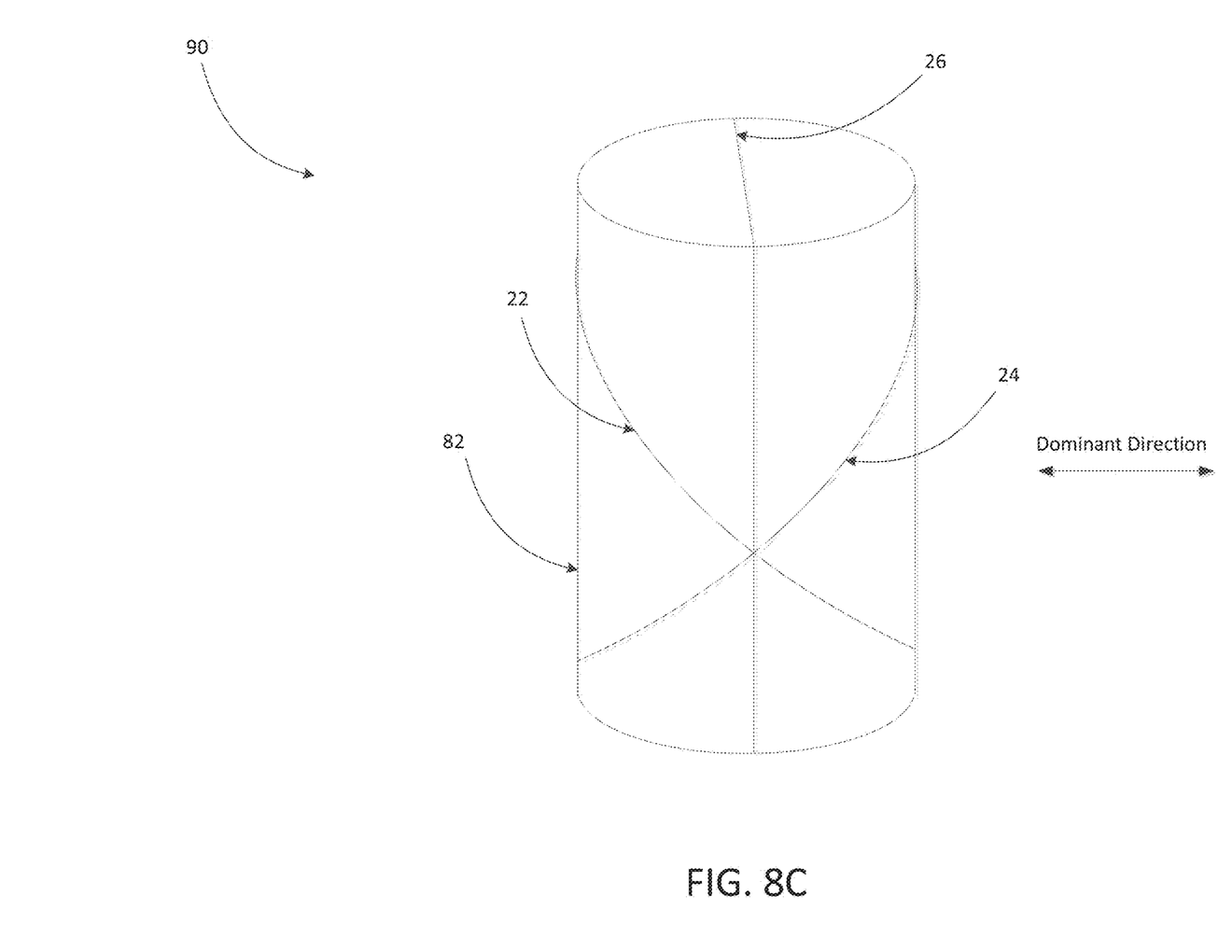
FIG. 8C shows another schematic of a 3D position sensor with a dominant direction.

FIG. 8C shows a schematic of a 3D position sensor 90 having a cylindrical shape. The position sensor 90 may comprise a ferromagnetic shield 82, a first coil 22, a second coil 24, and a third coil 26. The first coil 22, second coil 24, and third coil 26 may be disposed around the ferromagnetic shield 82 in any suitable manner so long as the planes defined by each coil are not parallel. In FIG. 8C, the third coil 26 may be substantially perpendicular to the top or bottom face of the ferromagnetic shield 82. As described above, while the first coil 22, second coil 24, and third coil 26 are shown as only having one winding each, they may comprise any suitable number of windings. The ferromagnetic shield 82 may contain an electronics module (not shown), attached to the terminations of the first coil 22, the second coil 24, and third coil 26. The electronics module may execute position sensing measurements and position determination calculations. While the ferromagnetic shield 82 is shown as a cylinder, it may take any shape suitable for containing the electronics module and having the first coil 22, second coil 24, and third coil 26 wound around it.

As discussed above, a position sensor may be controlled using a controller, which may be implemented by any suitable type of circuitry. For example, the controller may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

While the description above shows a position sensor with two or three sensor coils, any number of coils may be used to determine position in one or more dimensions. Similarly, any shape may be used for the ferromagnetic shield provided that the electronics module may be contained within the shield and the at least one coil may be wound around the exterior of the ferromagnetic shield. The ferromagnetic shield may be of any suitable thickness, such as a 1 mm, or 10 mm, depending the shielding required by the internal electronics, and the sensitivity desired for the coils.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A sensor comprising:
   a ferromagnetic shield;
   a plurality of sensor coils disposed around an exterior of the ferromagnetic shield; and
   an electronics module within the ferromagnetic shield, the electronics module being configured to determine a position and/or orientation of the sensor based at least in part on measurements of signals induced in the plurality of sensor coils, wherein the electronics module includes a controller that is electrically connected to at least one sensor coil of the plurality of sensor coils through a conductor that extends through an aperture in the ferromagnetic shield.

2. The sensor of claim 1, wherein the plurality of sensor coils comprises a first sensor coil, a second sensor coil and a third sensor coil.

3. The sensor of claim 2, wherein the first, second and third sensor coils are mutually orthogonal.

4. The sensor of claim 1, wherein the ferromagnetic shield is comprised of two or more sheets of ferromagnetic material.

5. The sensor of claim 1, wherein an antenna extends through the aperture.

6. The sensor of claim 1, wherein the electronics module includes an energy storage device.

7. The sensor of claim 6, wherein electronics module is configured to receive power wireles sly via at least one sensor coil of the plurality of sensor coils.

8. The sensor of claim 1, wherein the sensor comprises a container and the ferromagnetic shield comprises a ferromagnetic material on a surface of the container.

9. A position and/or orientation sensing system comprising:
   a base station, configured to emit a magnetic field; and
   a sensor comprising:
   a ferromagnetic shield;
   a plurality of sensor coils disposed around an exterior of the ferromagnetic shield; and
   an electronics module within the ferromagnetic shield, the electronics module being configured to determine the position and/or orientation of the sensor based at least in part on measurements of signals induced in the plurality of sensor coils by the magnetic field,
   wherein the electronics module includes a controller that is electrically connected to at least one sensor coil of the plurality of sensor coils through a conductor that extends through an aperture in the ferromagnetic shield.

10. The position and/or orientation sensing system of claim 9, wherein the sensor is further configured to transmit the determined position and/or orientation of the sensor to the base station.

11. The position and/or orientation sensing system of claim 9, wherein the electronics module is further configured to transmit the determined position and/or orientation of the sensor externally to the electronics module.

* * * * *